United States Patent
Hufnagel et al.

(10) Patent No.: US 8,119,964 B2
(45) Date of Patent: Feb. 21, 2012

(54) SAFETY DEVICE FOR A PRESS BRAKE TYPE OF MACHINE

(75) Inventors: Mark Hufnagel, Wolfsschlugen (DE); Guillaume Barthe, Ostfildern (DE); Soeren Hader, Esslingen (DE)

(73) Assignee: Pilz GmbH & Co. KG, Ostfildern (DE)

( * ) Notice: Subject to any disclaimer, the term of this patent is extended or adjusted under 35 U.S.C. 154(b) by 152 days.

(21) Appl. No.: 12/512,137

(22) Filed: Jul. 30, 2009

(65) Prior Publication Data
US 2010/0012821 A1  Jan. 21, 2010

Related U.S. Application Data

(63) Continuation of application No. PCT/EP2008/000475, filed on Jan. 23, 2008.

(30) Foreign Application Priority Data

Jan. 30, 2007  (DE) .......................... 10 2007 006 306

(51) Int. Cl.
G01C 21/02  (2006.01)
G01C 21/24  (2006.01)

(52) U.S. Cl. ................ 250/206.1; 250/222.1; 250/559.2

(58) Field of Classification Search .............. 250/223 B, 250/559.2, 559.22, 221, 222.1, 206.1; 340/555–557; 356/141.1, 141.03
See application file for complete search history.

(56) References Cited

U.S. PATENT DOCUMENTS

| 4,183,013 A * | 1/1980 | Agrawala et al. ............. 382/173 |
| 6,348,685 B1 | 2/2002 | Givet |
| 2004/0070751 A1 * | 4/2004 | Bergbach et al. .......... 356/141.3 |
| 2005/0235790 A1 | 10/2005 | Dieterle et al. |
| 2006/0145101 A1 * | 7/2006 | De Coi ..................... 250/559.12 |
| 2007/0214854 A1 | 9/2007 | Braune et al. |

FOREIGN PATENT DOCUMENTS

| DE | 913 013 | 6/1954 |
| DE | 199 10 321 A1 | 9/1999 |
| DE | 103 27 388 A1 | 1/2005 |
| DE | 103 53 353 A1 | 6/2005 |
| DE | 10 2004 020 024 A1 | 11/2005 |

(Continued)

OTHER PUBLICATIONS

A New Era in Electronic Imaging; High-Dynamic-Range Color Imaging; 1998; 12 pages.

(Continued)

*Primary Examiner* — Francis M Legasse, Jr.
(74) *Attorney, Agent, or Firm* — Harness, Dickey & Pierce, P.L.C.

(57) ABSTRACT

A safety device for a machine, such as a press brake, has a light transmitter, a light receiver and an evaluation unit. The light receiver is coupled to a moving machine part such that it runs ahead of a front edge of the machine part during the operational movement. The light transmitter comprises a light source having a predominantly incoherent radiation for generating a light beam that runs substantially parallel to the edge and illuminates the light receiver. The light receiver has an image sensor with a plurality of pixels for recording a spatially resolved image of the light beam, and it has an imaging optics having a focal point and an aperture stop which is substantially arranged at the focal point.

15 Claims, 4 Drawing Sheets

FOREIGN PATENT DOCUMENTS

| | | |
|---|---|---|
| EP | 1 246 148 A2 | 10/2002 |
| EP | 1 589 355 A1 | 10/2005 |
| EP | 1 647 357 A1 | 4/2006 |
| JP | 2004120724 A * | 4/2004 |
| WO | WO 02/03026 A1 | 1/2002 |
| WO | WO 2005/056207 A1 | 6/2005 |
| WO | WO 2006/135961 A1 | 12/2006 |

OTHER PUBLICATIONS

EN 954-1; Safety-related parts of control systems; Mar. 1997; 33 pages.
Functional safety and IEC 61508; Sep. 2005; 13 pages.
SICK Sensor Intelligence; Operating Instructions; V4000 Press Brake sensor system; Aug. 2005; 5 pages.

* cited by examiner

SAFETY DEVICE FOR A PRESS BRAKE TYPE OF MACHINE

CROSS REFERENCES TO RELATED APPLICATIONS

This application is a continuation of international patent application PCT/EP2008/000475 filed on Jan. 23, 2008 designating the U.S., which international patent application has been published in German language as WO 2008/092588 A1 and claims priority from German patent application DE 10 2007 006 306.9 filed on Jan. 30, 2007. The entire contents of these prior applications are incorporated herein by reference.

BACKGROUND OF THE INVENTION

The present invention relates to a safety device for a machine having a first machine part executing an operational movement towards a second machine part. More particularly, the invention relates to a camera based safety device for a press brake and similar kinds of machines.

DE 10 2004 020 024 A1 discloses a safety device having a light transmitter with a transmission optics and an LED or laser diode as light source. The transmission optics expands the light of the light source to form a light beam. This light beam illuminates a light receiver including an image sensor. The light transmitter and light receiver thus form a light barrier that monitors a protection zone at the lower projecting edge of an upper die on a die press brake. This light barrier is also moved in the operational movement of the upper die in order to detect any dangerous intervention of an object in the work path of the upper die. Whenever an intervention in the protection zone is detected, the known safety device generates signals that result in the die press brake being shut off. DE 10 2004 020 024 A1 purports that the safety device is capable of determining measurement values that relate to individual areas of a workpiece or the die. These measurement values are supposed to be determined by means of the silhouette produced by the workpiece or the die on the light-sensitive elements (pixels) of the image sensor.

For the purpose of determining the measurement values, DE 10 2004 020 024 A1 proposes to define specific pixels of the image sensor as measuring windows which are positioned where silhouette areas with a straight contour are imaged. If appropriate, the measuring windows are supposed to move in the course of the bending process. However, the document does not describe how the measurement values are actually determined. The definition of special measuring windows implies that the algorithm is complex and computational intensive, such that it can be carried out only within relatively small image regions, namely the measuring windows, within the available measuring times. The position and the size of the measuring windows, however, must firstly be determined, and this requires an additional computational outlay. The determination of measurement values which refer to individual areas of a workpiece or the die is therefore not without problems with the known approach.

The assignee of DE 10 2004 020 024 A1, namely Sick AG, 79183 Waldkirch, Germany, offers such a safety device under the brand name V4000. The safety device V4000 uses a laser diode for generating the light beam and is described in detail in an instruction manual available from Sick AG. Interestingly, there is no indication that the safety device V4000 is actually capable of determining measurement values with reference to a workpiece or a die. The V4000 system only operates as a safety device for safeguarding a press brake machine.

SUMMARY OF THE INVENTION

In view of this background, it is an object of the present invention to provide a safety device of the type mentioned at the beginning, wherein the determination of measurement values representing the location, orientation and/or size of a workpiece or a die can be done easily, quickly and with high accuracy.

It is another object of the invention to provide a machine having a moveable die, such as a press brake, which machine comprises a new safety device capable of delivering measurement values representing the location, orientation and/or size of a workpiece and/or the die in an easy and reliable manner.

According to one aspect of the present invention, there is provided a safety device for a machine having a first machine part executing an operational movement towards a second machine part, the first machine part having an edge projecting in a direction of movement and defining a movement plane, the safety device comprising a light transmitter, a light receiver coupled to the first machine part such that it runs ahead of the edge during the operational movement of the first machine part, and an evaluation unit, wherein the light transmitter comprises a light source having a predominantly incoherent radiation for generating a light beam that runs substantially parallel to the edge and illuminates the light receiver, wherein the light receiver comprises an image sensor having a plurality of pixels for recording a spatially resolved image of the light beam, and comprises an imaging optics having a focal point and an aperture stop which is substantially arranged at the focal point, and wherein the evaluation unit is designed to generate an output signal as a function of the spatially resolved image.

According to another aspect of the invention, there is provided a machine comprising a first machine part, a second machine part and a safety device, the first machine part being configured to execute an operational movement towards the second machine part, and the first machine part having an edge projecting in a direction of the operational movement and defining a movement plane during the operational movement, the safety device comprising a light transmitter, a light receiver and an evaluation unit, with at least the light receiver being coupled to the first machine part such that it runs ahead of the edge during the operational movement, with the light transmitter generating a light beam that runs substantially parallel to the edge and illuminates the light receiver, with the light receiver comprising an image sensor having a plurality of pixels for recording a spatially resolved image of the light beam, and with the evaluation unit being designed to generate an output signal as a function of the spatially resolved image, wherein the light transmitter comprises a light source having a predominantly incoherent radiation for generating the light beam, wherein the light receiver comprises an imaging optics having a focal point and an aperture stop which is arranged at the focal point, wherein the aperture stop has a clear inside diameter that is smaller than 1 mm, wherein the evaluation unit is designed to detect an intensity characteristic in the spatially resolved image that is monotonically rising or monotonically falling over a plurality of adjacent pixels, and wherein the evaluation unit is designed to detect an inflection point in the monotonically rising or monotonically falling intensity characteristic in order to determine an edge location of an object that projects into the light beam.

"Coherence" denotes the property of light (or other waves) to maintain a defined phase relationship over a large spatial and/or temporal range. Two or more waves are considered to be coherent if they are capable of generating interference phenomena which are largely invariant over the time. Coherence is particularly existent in the case of light that is generated by lasers. By contrast, non-laser light sources generally generate an incoherent radiation in terms of the present invention.

Consequently, the present invention proposes to avoid a conventional laser as the main light source for generating the light beam in the light transmitter. Prima facie, this is not plausible and in contrast to the prevailing opinion in this field of the art, because, owing to its coherent and typically strongly focused radiation, laser light promises sharp imaging of areas of a workpiece or a die on the image sensor, and therefore sharp silhouettes. This, in turn, promotes the long standing expectation that the position of an edge of a workpiece or a die can be detected and measured very precisely using laser light. In fact, all existing devices, such as the V4000 mentioned at the beginning, use laser light.

The assignee's investigations, however, have shown that the use of coherent laser light is disadvantageous for the measurement of a workpiece or a die in the silhouette of the light beam, because interference phenomena of the laser light cause signal characteristics on the image sensor that are very difficult to evaluate. The determination of the measurement values is thus complicated and difficult.

Surprisingly, it has been found that the use of largely incoherent, i.e. diffuse or "fuzzy" light, is more advantageous, although the silhouettes themselves are more fuzzy than with sharply focused laser light. However, this disadvantage can be compensated by means of the abovementioned imaging optics on the receiver side, and it can even be turned around into an advantage.

The consequence of the imaging optics mentioned above using a very small aperture stop at the focal point is that the image sensor is reached only by light beams that are incident parallel to the optical axis. Other light beams do generally not reach the image sensor. In addition, the incident light beams experience diffraction at the edges of the aperture stop, i.e. they are deflected from their direction. The smaller the aperture stop is, the more strongly is this effect. The result of the diffraction is that a silhouette is imaged in a distributed fashion over a plurality of adjacent pixels of the image sensor. However, this takes place with virtually no interference phenomena as a result of the incoherent light and the limitation to parallel beams. In other words, use of incoherent light and use of the imaging optics mentioned above results in an intensity characteristic on the image sensor that has a relatively wide "gray" transition region between the dark silhouette of the workpiece or the die and the light beam parts which are not intercepted.

Prima facie, it seems as if such a fuzzy imaging of the bright/dark edge, which is sharp per se, is disadvantageous if the goal is to measure the position of the bright/dark edge as exactly as possible. Surprisingly, however, it has turned out that the "fuzzy" intensity characteristic can be evaluated rather simply, and the location of the edge can be determined very precisely, because the resulting intensity characteristic can be mathematically modeled very easily. Consequently, the actual position of the bright/dark edge can be determined very accurately despite the fuzzy imaging. A preferred mode of procedure in this regard is described further below.

In summary, the novel safety device therefore enables a surprisingly simple, but accurate determination of measurement values that are representative of the position of a workpiece or die edge in the visual range of the light receiver. The simple algorithm can be processed very quickly. The abovementioned object is therefore completely achieved.

In a preferred refinement, the light source generates a radiation having a continuously extended spectral intensity distribution.

In this refinement, the light source generates a "polychromatic" light radiation with a virtually unlimited plurality of wavelengths. In a preferred exemplary embodiment, a so-called Power-LED is used as a light source, which Power-LED has a main spectrum situated at wavelengths of approximately 520 to 550 nm, although wavelengths outside this spectral region are also represented. It is particularly preferred if the spectral intensity distribution of the light source is Gaussian. In conjunction with the preferred imaging optics, such a light source generates a very uniform and substantially symmetrical, monotonically rising or monotonically falling signal characteristic in the region of light/dark edges. Consequently, the location and position of a light/dark edge can be determined particularly simply when such a light source is used. It is particularly preferred to use a Power-LED with a light yield at 30 lm/W and higher.

In a further refinement, the light transmitter has a collective lens in order to concentrate the radiation of the light source.

In this refinement, the light source has a radiation lobe with a first aperture angle (at least parallel to the movement plane), and the light beam has a second aperture angle (parallel to the movement plane), with the second aperture angle being substantially smaller than the first aperture angle. In a preferred exemplary embodiment, the light source has, by way of example, a radiation lobe with an aperture angle of approximately 100° to 120°, whereas the aperture angle of the light beam is of the order of magnitude of approximately 1° or less. The collective lens thus concentrates the light radiation of the light source, whereas the systems known in the prior art all make use of lenses where the light beam of the light source is expanded. The preferred refinement simplifies the determination of measuring positions at edges even further, because the quantity of light is concentrated for illuminating the light receiver, and so larger bright/dark differences are available for the evaluation.

In a further refinement, the aperture stop of the imaging optics in the light receiver has a clear inside diameter that is smaller than approximately 1 mm, preferably smaller than approximately 500 µm, and, even further preferred, smaller than 150 µm. In a particularly preferred exemplary embodiment, an aperture stop with an inside diameter of approximately 75 µm is used.

This refinement is advantageous because a small aperture stop leads to stronger diffraction effects with the result that the gradient of the intensity characteristic becomes rather flat in the region of a light/dark edge. The smaller the aperture stop is, the shallower is the gradient of the intensity characteristic. A consequence of a shallow gradient is that the intensity characteristic is imaged onto a higher number of adjacent pixels. Consequently, many interpolation points are available for mathematically modeling the intensity characteristic. Moreover, in the context of the present invention a flat intensity characteristic has the further advantage that individual pixel errors do not influence the measuring accuracy, or do so only negligibly.

In a further refinement, the evaluation unit is designed to generate a failsafe shutoff signal when a defined region of the light beam is interrupted.

In this refinement, the safety device is designed to be fail-safe within the meaning of categories 3 or 4 of European standard EN 954-1 or within the meaning of comparable standards such as, for example, IEC 61508. In preferred exemplary embodiments, the evaluation unit is designed in a redundant fashion with a plurality of channels in order to implement this fail-safety. This refinement is advantageous for the use of the safety device in safeguarding a machine, because it allows the machine designer to comply with the corresponding safety requirements more easily.

In a further refinement, the evaluation unit is designed to detect intensity characteristics in the spatially resolved image that are monotonically rising or monotonically falling over a plurality of adjacent pixels, in order to determine an edge location of objects that project into the light beam. The evaluation unit preferably detects such intensity characteristics over a plurality of at least four adjacent pixels. Even more preferred is to detect such intensity characteristics over six or eight adjacent pixels. In a particularly preferred exemplary embodiment, approximately ten adjacent pixels each are evaluated in order to detect the intensity characteristics.

This refinement provides a very simple algorithm for measuring areas of a workpiece or a die. The detection of such intensity characteristics can be implemented relatively simply and quickly by comparing the intensity values or grayscale values in respectively neighboring pixels. Moreover, the detected intensity characteristic can be evaluated very quickly in a subsequent step in order to determine the location of the bright/dark edge of a workpiece or a die with high measurement accuracy.

In a further refinement, the evaluation unit is designed to detect inflection points in the intensity characteristics in order to determine an edge location of an object.

The detection of inflection points in the intensity characteristics can be implemented simply and quickly by forming the first and second derivative of the intensity characteristic. It has turned out, moreover, that the location of a point of inflection in such an intensity characteristic constitutes a good representation of the actual location of the bright/dark edge. The position of a bright/dark edge can therefore be determined with high accuracy by determining the position of the inflection point on the intensity characteristic.

In a further refinement, the light transmitter generates the light beam with a defined temporally varying intensity.

In this refinement, the light beam of the light transmitter is modulated in time. The modulation represents a signal component that can be evaluated on the receiver side in order to distinguish the light beam from extraneous light influences, for example. This refinement therefore enables a higher functional safety and operational reliability of the new safety device.

In a further refinement, the image sensor comprises a characteristic transducer curve which is at least approximately logarithmic.

The characteristic transducer curve in terms of this refinement describes the functional relationship of the electrical output signals of the image sensor (electrical currents and/or voltages) as a function of the radiation intensity of the incident light. An image sensor with an approximately logarithmic transducer curve is capable of processing high intensity differences of the incident light with a high measuring accuracy. Consequently, such an image sensor is particularly advantageous for a safety device of the present type, where the image sensor is directly illuminated by means of a light beam and where silhouettes of objects that at least partially cover the light beam are to be detected and measured.

It goes without saying that the features mentioned above and those to be explained below can be used not only in the combination respectively specified, but also in other combinations or on their own, without departing from the scope of the present invention.

BRIEF DESCRIPTION OF THE DRAWINGS

Exemplary embodiments of the invention are illustrated in the drawing and explained in more detail in the following description. In the drawing.

DESCRIPTION OF PREFERRED EMBODIMENTS

Figure 1:
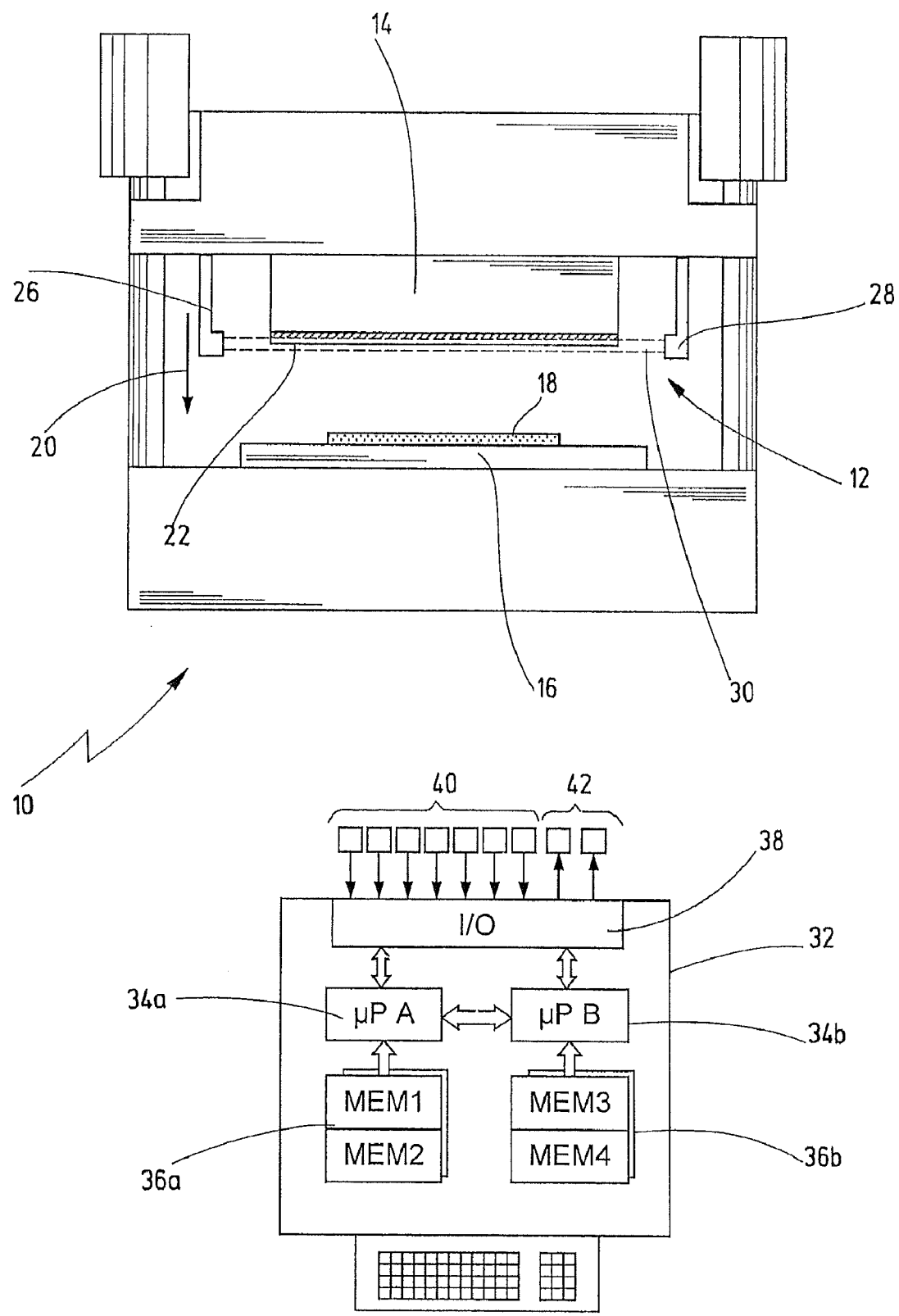
FIG. 1 shows a press brake with an exemplary embodiment of the novel safety device.

Illustrated in FIG. 1 is a press brake 10 on which a safety device 12 according to an exemplary embodiment of the present invention is applied in order to prevent injury to operators in the work cycle of the press brake 10. Press brake 10 has an upper die 14 and a lower die 16. The lower die 16 typically has a depression in the cross-sectional profile (FIG. 5) such that it forms a matrix into which the upper die 14 can dip in order to form the workpiece 18. The operational movement of the upper die 14 is represented by reference numeral 20 in FIG. 1.

Upper die 14 has a projecting edge 22 (FIG. 4) that defines a movement plane 24 as a result of the operational movement 20. Every intervention of an object in the movement plane 24 such as, for example, an intervention by the hand of an operator, represents a hazardous situation, particularly when the upper die 14 has already closely approached the lower die 16. The safety device 12 serves for detecting such interventions in the region of the projecting edge 22 in order to stop the operational movement of the press brake 10 as a function thereof.

The present safety device can, however, be used not only to safeguard press brakes such as illustrated in FIG. 1. The safety device according to the present invention can also be used for safeguarding stamping machines, cutting machines and any other sort of—preferably stationary—machines, where a first machine part executes an operational movement towards a second machine part. The invention is not limited to applications where only one machine part is moved. The safety device according to the present invention can equally be used for machines in which a number of machine parts are moved relative to one another.

The safety device 12 comprises a light transmitter 26 and a light receiver 28 which are fastened here on the press brake 10 to the right and to the left of the upper die 14. The light transmitter 26 and the light receiver 28 are coupled to the upper die 14 such that they run with the operational movement 20 of the upper die 14. In this case, the light transmitter 26 generates a light beam 30 that runs parallel to edge 22 of upper die 14 and illuminates the light receiver 28. Consequently, the light transmitter 26 and the light receiver 28 form some sort of light barrier that safeguards the region of space before and around edge 22 of the upper die 14.

The exemplary embodiment illustrated in FIG. 1, where both the light transmitter 26 and the light receiver 28 run with the operational movement of the upper die 14, is preferred from the present point of view. However, in principle the light transmitter 26 could be rigidly arranged when, for example, it generates a light band or a light plane that lies parallel to movement plane 24. In principle, the light receiver could also be stationary if it is capable of recording an image of the light beam 30 at all relevant points in the course of the operational movement of the upper die 14. However, with the technologies currently available this cannot be implemented with a stationary image sensor, or can be implemented only in an extremely complicated fashion, for which reason the completely mobile variant preferred from the present point of view.

An evaluation unit, which is represented at reference numeral 32 in FIG. 1, is also a part of safety device 12. The evaluation unit 32 can be arranged separately from the light transmitter 26 and the light receiver 28. As an alternative, the evaluation unit 32 can be integrated entirely or partially in the light transmitter 26 and/or in the light receiver 28. In both cases, the evaluation unit 32 serves to drive the light transmitter 26 (if necessary), and to evaluate the images recorded by means of the light receiver 28 in order to stop the operational movement 20 of the upper die 14 as a function thereof. Moreover, in a preferred exemplary embodiment of the invention, the evaluation unit 32 allows to measure the position and the dimensions of individual areas of a workpiece or the die, as is explained in more detail below.

In a preferred exemplary embodiment, the evaluation unit 32 is designed in a redundant fashion with a plurality of channels. This is illustrated in FIG. 1 by means of two processors 34a, 34b that can exert mutual control and exchange their processing results. In particularly preferred embodiments, processors 34a, 34b exhibit diversity, i.e. they are different processors, in order to reduce the probability of a common cause error.

Each of processors 34a, 34b executes an evaluation and control program that is stored in appropriately assigned memory areas 36a, 36b.

Reference numeral 38 denotes an interface unit by means of which the processors 34a, 34b read in input signals at inputs 40 and provide output signals at outputs 42. In the preferred exemplary embodiment, processors 34a, 34b inter alia generate a failsafe, preferably redundant output signal by means of which the operational movement 20 of the upper die 14 is stopped when a dangerous intervention in the region below edge 22 is detected. Moreover, it is possible to provide at further outputs measurement data that are representative of the position, orientation and/or size of a workpiece or die.

In addition to the evaluation unit 32, press brake 10 typically has an operational controller that controls the "normal" operational sequence. In principle, this control could be combined with evaluation unit 32. However, it is currently preferred to implement the evaluation unit 32 separately from the operational controller (not illustrated here) for the press brake 10.

Figure 2:
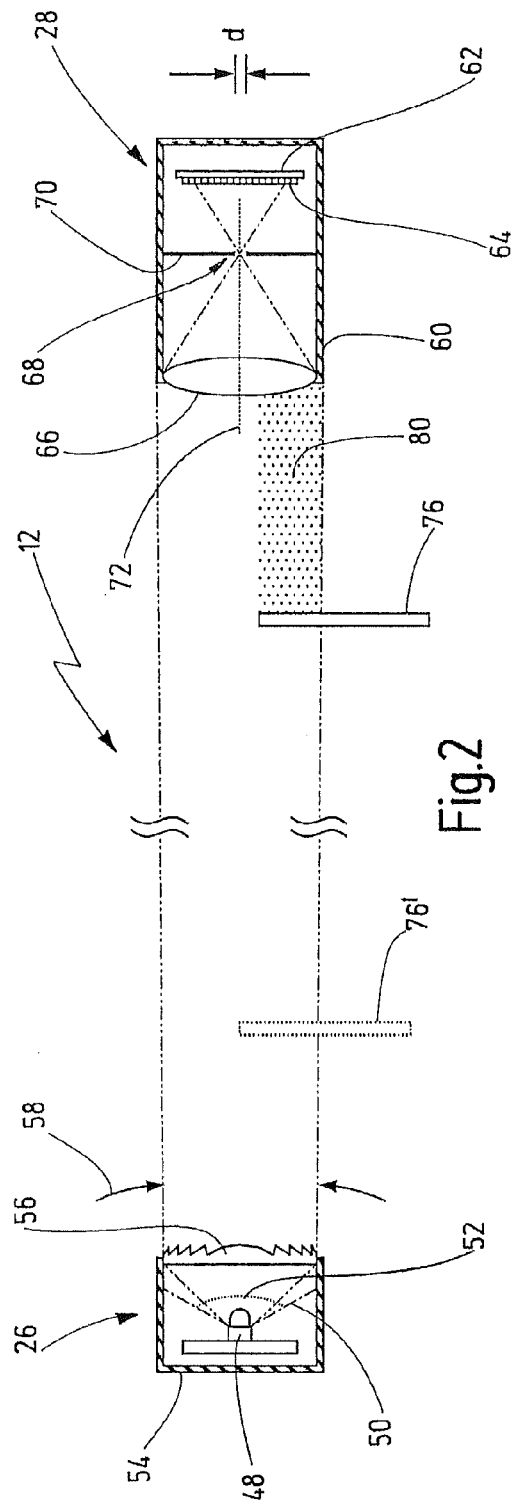
FIG. 2 shows a simplified illustration of a preferred exemplary embodiment of the novel safety device.

FIG. 2 shows the design principle of the safety device 12. The light transmitter 26 has a light source 48 that, in a particularly preferred exemplary embodiment, is a so-called Power-LED with a light yield of approximately 70 lm/W. In principle, however, it could also be an incandescent lamp or another light source that generates an at least predominantly incoherent light radiation.

Here, light source 48 has a radiation lobe 50 with an aperture angle 52 that is approximately 100° to 120° (in a plane parallel to the movement plane 24). The light source 48 is installed in a housing 54 that is sealed to the front with a lens 56. The lens 56 is a collective lens (here as Fresnel lens) that concentrates the light radiation of light source 48 to the extent that the emerging light beam 30 has an aperture angle 58 which is only 1° or less in the preferred exemplary embodiment.

In preferred exemplary embodiments, light source 48 generates the light beam 30 with a defined temporal variation that is evaluated in the light receiver 28 or the evaluation unit 32 as defined expectations in order to distinguish from extraneous light influences.

Figure 8:
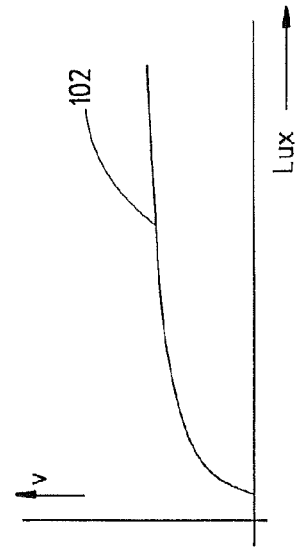
FIG. 8 shows a simplified illustration of the logarithmic transducer curve of a preferred image sensor for the safety device from FIG. 2.
Figure 4:
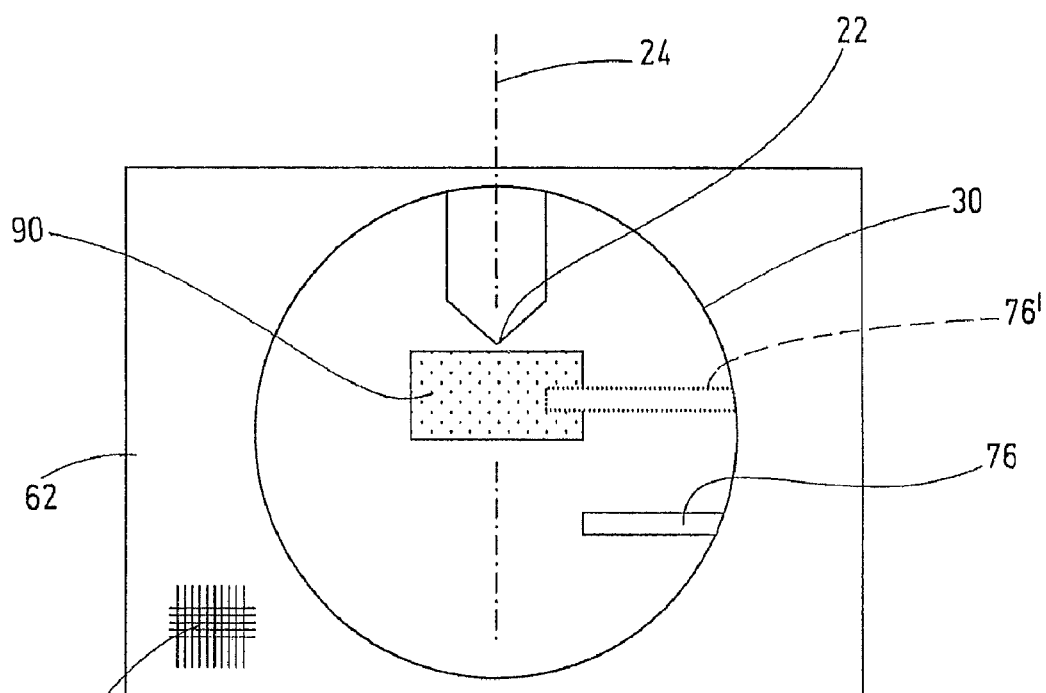
FIG. 4 shows a simplified illustration of an image recorded by means of the image sensor of the safety device from FIG. 2, when the upper die of the press brake from FIG. 1 is located at the start of the operational movement.
Figure 5:
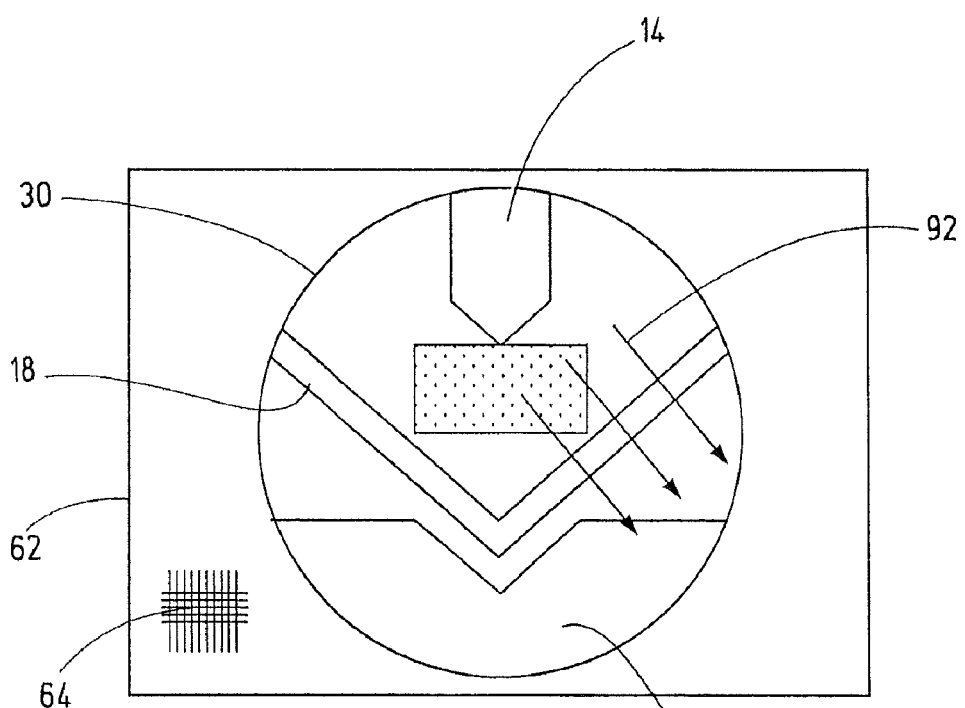
FIG. 5 shows an illustration similar to that from FIG. 4, with the upper die here being located at the lower reversal point.

The light receiver 28 has a second housing 60, in which an image sensor 62 with a plurality of pixels 64 is arranged. It is preferably an image sensor with a matrix-like arrangement of pixels, as illustrated in FIGS. 4 and 5. In a preferred exemplary embodiment, the image sensor 62 is a CMOS image sensor with a logarithmic transducer curve 102, as illustrated in a simplified fashion in FIG. 8. Such image sensors are available, from Institut fuer Mikroelektronik Stuttgart, in Stuttgart, Germany sold under the brand name HDRC®.

The light receiver 28 further has an imaging optics 66 with a focal point 68 at which the aperture stop 70 is arranged. In a preferred exemplary embodiment, the clear inside diameter d of the aperture stop 70 is approximately 75 μm. Even smaller aperture stop openings would be advantageous in order to generate even more homogeneous intensity characteristics of bright/dark edges on the image sensor 62, although a certain minimum light quantity must necessary pass through the aperture stop. In principle, it would also be possible to use somewhat larger aperture stop openings if a corresponding degradation of the intensity characteristics are accepted. An order of magnitude in the range between approximately 50 μm to 150 μm has proved to be particularly advantageous. The optical axis of the imaging optics 66 is denoted in FIG. 2 by the reference numeral 72.

The reference numeral 76 denotes an object that projects into the light beam 30 and has a front edge 78. In the region of the front edge 78 there is a bright/dark edge that produces a corresponding intensity characteristic in the image recorded by means of image sensor 62. The silhouette range generated by the object 76 is denoted by the reference numeral 80 in FIG. 2 and illustrated here only in the simplified fashion.

At reference numeral 76', the object 76 is illustrated in a second position in which the distance to the light receiver 28 is greater than in the case of reference numeral 76. This is significant with regard to the intensity characteristics that result on the image sensor 62.

Figure 3:
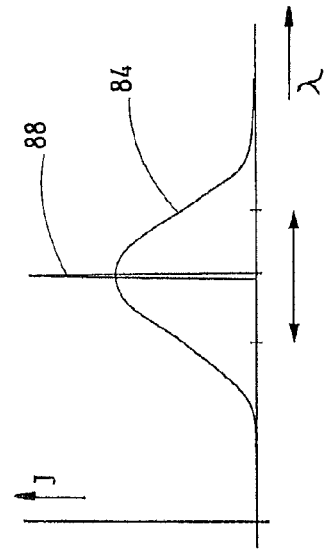
FIG. 3 shows the spectral intensity distribution of the light source from the safety device in accordance with FIG. 2, in contrast with the spectral intensity distribution of a laser light source.

FIG. 3 is a simplified illustration of the spectral intensity distribution 84 of the light source 48. In the preferred exemplary embodiments, the intensity distribution 84 is substantially continuous and approximately Gaussian. By comparison therewith, reference numeral 88 illustrates the spectral intensity distribution of a laser light source in a simplified fashion.

In a preferred exemplary embodiment, the spectral intensity distribution of the light source 48 covers a spectrum from approximately 520 to 550 nm, the maximum being at 535 nm approximately. By comparison, the spectrum 88 of the laser light source covers only a region that is located in a virtually rectilinear fashion at a wavelength of 535 nm, for example. However, not only does the light radiation of the preferred light source 48 cover a larger spectral region than a laser light source, but the individual beam components also do not exhibit a fixed phase relationship in order to obtain light that is as incoherent as possible.

FIG. 4 shows the image sensor 62 with the image of the light beam 30 that includes in the silhouette the lower edge 22 of the upper die 14, and the objects 76, 76'. In a preferred exemplary embodiment, a protected area 90 is defined below the edge 22. The protected area 90 comprises a plurality of pixels onto which the region of the light beam 30 below the edge 22 is imaged. In the preferred exemplary embodiment, the operational movement of the upper die 14 is stopped whenever an object 76' projects into the protected area 90, whereas an object 76 that does not project into the protected area 90 does not result in stopping of the operational movement 20. The size and location of the protected area 90 can be variably set on the basis of the plurality of the pixels 64 and can, for example, be adapted to the working speed of upper die 14 and to the overtravel associated therewith.

FIG. 4 shows an image of light beam 30 when upper die 14 is still located relatively far above. By contrast, FIG. 5 illustrates an image after the upper die 14 has already dipped into matrix 16 and the workpiece 18 has been bent. Accordingly, not only upper die 14, but also matrix 16 and workpiece 18 are to be seen in the silhouette.

In the case of reference numeral 92, arrows illustrate a preferred search direction along which the pixels 64 of the image sensor 62 are searched through for monotonically rising or monotonically falling intensity characteristics. Two such intensity characteristics are illustrated by way of example in FIG. 6 and denoted by reference numerals 94, 96. The illustration is normalized so that the bright/dark edge lies at the ordinate 98. In other words, in the normalized illustration of FIG. 6, a sharp bright/dark edge is located at the vertical line 98. The area to the left of the vertical line 98 is the dark region, while the area to the right of the line 98 is the bright region with the correspondingly high intensity values. The pixels of the image sensor 62 along the search direction 92 are specified on the abscissa.

Figure 6:
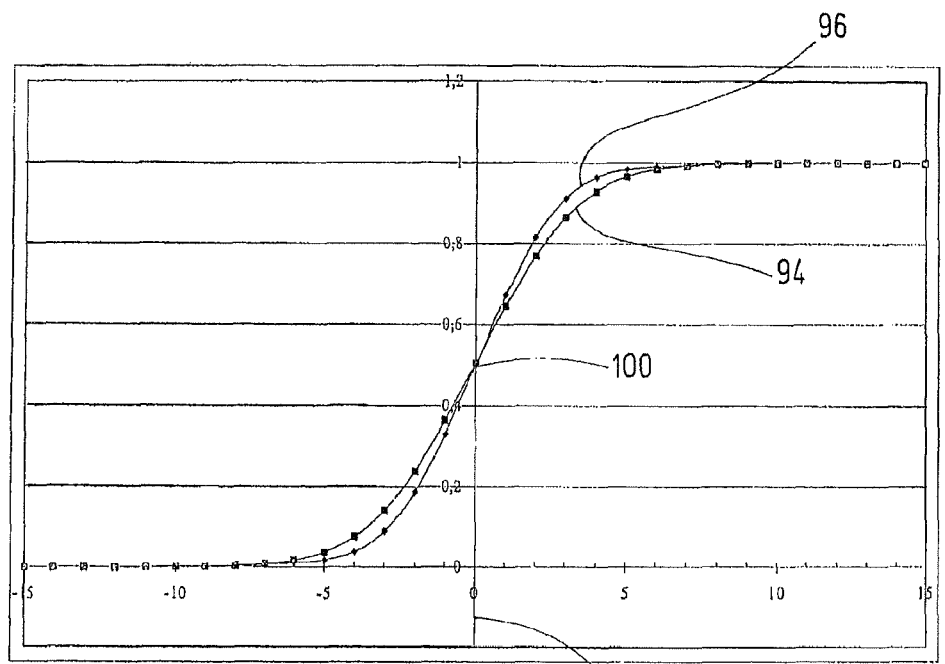
FIG. 6 shows two intensity characteristics that represent a bright/dark edge in the field of view of the light receiver of the safety device from FIG. 2.

The illustration in FIG. 6 shows intensity characteristics that were calculated by means of a simulation tool. Metrologically, curves appear on which noise and other signal interference are superposed. To this extent, the actual intensity characteristics are not as ideal as illustrated in FIG. 6. However, even in the case of characteristics determined by measurement the fundamental shape of the curve is present.

As may be seen from the illustration in FIG. 6, the intensity characteristics 94, 96 are by no means as steep as the sharp bright/dark edge would suggest, and this is to be ascribed, above all, to diffraction effects at the aperture stop 70. The smaller the inside diameter of the aperture stop 70 is, the stronger are the diffraction effects, and the flatter are the intensity characteristics 94, 96.

The two intensity characteristics 94, 96 result from different distances between the object 76 or 76' and the light receiver 28. In other words, slightly different gradients of the intensity characteristics 94, 96 result depending on how far an object edge is away from the image sensor 62. The differences are, however, slight (and lessen with increasingly smaller aperture stop openings), and the fundamental shape of the curve is identical to the intensity characteristics 94, 96. What is involved in both cases are monotonically rising characteristics for dark/bright edges and correspondingly monotonically falling intensity characteristics for bright/dark edges. Owing to the shallow gradients, the intensity characteristics 94, 96 are imaged onto a plurality of adjacent pixels. In the present case, the transition region of the intensity characteristics 94, 96 which is of interest extends over approximately ten to twelve adjacent pixels, which can be evaluated as interpolation points of a function that models the intensity characteristics 94, 96. Because of the monotonically constant behavior and the restriction of the maximum values (completely dark, maximum brightness), each of these curve characteristics has a point of inflection 100 whose location is a very exact measure of the location of the object edge (corresponding calibration of the imaging optics 66 and of the image sensor 62 being presupposed). Consequently, in preferred exemplary embodiments of the novel safety device, a search is made for monotonically rising intensity characteristics 94, 96, and the inflection points 100 of these intensity characteristics are identified in order to determine the position of an object edge 78. This can be implemented relatively simply and quickly by means of processors 34 using the intensity values of the adjacent pixels to determine a best fit function, and subsequently determining the first and second derivative of this best fit function.

When the position of a plurality of object edges of workpiece 18 are determined, it is possible to determine the location, shape and size of the workpiece 18. For example, this method can be used to determine the bending angle of workpiece 18 by measurement after the bending operation. Furthermore, it is possible to check if an appropriate upper die 14 is clamped in the press 10, or if a workpiece 18 whose thickness is too great or too small is inserted. Such measured values are advantageously used to prevent a defective or dangerous operation of the press 10.

Figure 7:
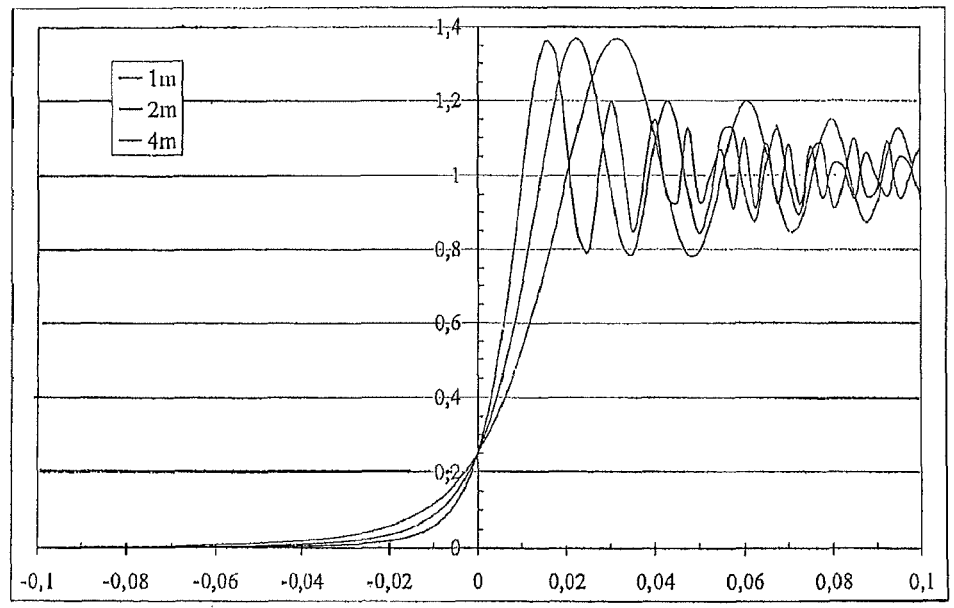
FIG. 7 shows three intensity characteristics which might result from the use of a laser light source in comparison with FIG. 6.

For the purpose of comparison, FIG. 7 shows (likewise calculated) normalized intensity characteristics of a similar safety device where, however, a laser light source has been adopted instead of the preferred Power-LED. Three curved characteristics are illustrated that result when an object 76 with an object edge 78 is held in the light beam 30 at three different distances from the light receiver 28.

Firstly, it is seen that the intensity characteristics have strong fluctuations that are to be ascribed to diffraction effects. In this case, the illustration in FIG. 7 only takes account of diffraction effects that result at the aperture stop. No account is taken of superposed diffraction effects that can result on the edge 78 itself. Overall, in the use of a coherent light source the resulting intensity characteristics are therefore yet more complicated and consequently difficult to evaluate. It is also to be seen that the intensity characteristics are greatly displaced as a function of the distance between object and light receiver, and this further complicates the determination of the exact position of the object edge 78.

In preferred exemplary embodiments, the novel safety device is not restricted to special measuring windows, i.e. the image of the light beam 30 with the silhouettes of any possible objects is preferably evaluated over the entire area in order to determine the position of bright/dark edges.

What is claimed is:

1. A safety device for a machine having a first machine part executing an operational movement towards a second machine part, the first machine part having an edge projecting in a direction of movement and defining a movement plane, the safety device comprising:
   a light transmitter,
   a light receiver coupled to the first machine part such that it runs ahead of the edge during the operational movement of the first machine part, and
   an evaluation unit,
   wherein the light transmitter comprises a light source having a predominantly incoherent radiation for generating a light beam that runs substantially parallel to the edge and illuminates the light receiver,
   wherein the light receiver comprises an image sensor having a plurality of pixels for recording a spatially resolved image of the light beam, and imaging optics having a focal point and an aperture stop which is substantially arranged at the focal point and has a clear inside diameter smaller than 1 mm,
   wherein the evaluation unit generates an output signal as a function of the spatially resolved image, and
   wherein the evaluation unit detects an inflection point in an intensity characteristic in the spatially resolved image that is monotonically rising or monotonically falling over a plurality of adjacent pixels in order to determine an edge location of an object that projects into the light beam.

2. The safety device of claim 1, wherein the light source generates a radiation having a continuously extended spectral intensity distribution.

3. The safety device of claim 1, wherein the light transmitter comprises a collective lens for concentrating the radiation of the light source.

4. The safety device of claim 1, wherein the aperture stop has a clear inside diameter that is smaller than 500 μm.

5. The safety device of claim 1, wherein the aperture stop has a clear inside diameter that is smaller than 150 μm.

6. The safety device of claim 1, wherein the evaluation unit is designed to generate a failsafe shutoff signal when a defined region of the light beam impinging on the image sensor is interrupted.

7. The safety device of claim 1, wherein the light transmitter generates the light beam with a predefined temporally varying intensity.

8. The safety device of claim 1, wherein the image sensor comprises a characteristic transducer curve which is at least approximately logarithmic.

9. A machine comprising a first machine part, a second machine part and a safety device, the first machine part executing an operational movement towards the second machine part, and the first machine part having an edge projecting in a direction of the operational movement and defining a movement plane during the operational movement, the safety device comprising a light transmitter, a light receiver and an evaluation unit, with at least the light receiver being coupled to the first machine part such that it runs ahead of the edge during the operational movement, with the light transmitter generating a light beam that runs substantially parallel to the edge and illuminates the light receiver, with the light receiver comprising an image sensor having a plurality of pixels for recording a spatially resolved image of the light beam, and with the evaluation unit generating an output signal as a function of the spatially resolved image, wherein the light transmitter comprises a light source having a predominantly incoherent radiation for generating the light beam, wherein the light receiver comprises an imaging optics having a focal point and an aperture stop which is arranged at the focal point, wherein the aperture stop has a clear inside diameter that is smaller than 1 mm, wherein the evaluation unit detects an intensity characteristic in the spatially resolved image that is monotonically rising or monotonically falling over a plurality of adjacent pixels, and wherein the evaluation unit detects an inflection point in the monotonically rising or monotonically falling intensity characteristic in order to determine an edge location of an object that projects into the light beam.

10. The machine of claim 9, wherein the light source generates a radiation having a continuous spectral intensity distribution.

11. The machine of claim 9, wherein the light transmitter comprises a collective lens for concentrating the radiation of the light source.

12. The machine of claim 9, wherein the inside diameter is smaller than 150 μm.

13. The machine of claim 9, wherein the evaluation unit generates a failsafe shutoff signal when the object projects into a predefined protective region of the light beam.

14. The machine of claim 9, wherein the light transmitter generates the light beam with an intensity varying temporally in a predefined manner.

15. The machine of claim 9, wherein the image sensor comprises a characteristic transducer curve which is at least approximately logarithmic.

* * * * *